(12) United States Patent
Parker et al.

(10) Patent No.: US 10,046,677 B2
(45) Date of Patent: Aug. 14, 2018

(54) SEAT SYSTEM FOR A VEHICLE

(71) Applicant: ClearMotion Acquisition I LLC, Woburn, MA (US)

(72) Inventors: Robert Preston Parker, Westborough, MA (US); Lawrence D. Knox, Hopkinton, MA (US); Travis Lee Hein, Holliston, MA (US); Steven N. Brown, Hopkinton, MA (US); Brian Alexander Selden, Concord, MA (US)

(73) Assignee: ClearMotion Acquisition I LLC, Woburn, MA (US)

( * ) Notice: Subject to any disclaimer, the term of this patent is extended or adjusted under 35 U.S.C. 154(b) by 706 days.

(21) Appl. No.: 13/868,741

(22) Filed: Apr. 23, 2013

(65) Prior Publication Data

US 2014/0316661 A1 Oct. 23, 2014

(51) Int. Cl.
*B60N 2/39* (2006.01)
*B60N 2/38* (2006.01)
*B60N 2/02* (2006.01)

(52) U.S. Cl.
CPC ............ *B60N 2/39* (2013.01); *B60N 2/38* (2013.01); *B60N 2002/0212* (2013.01); *B60N 2002/0216* (2013.01); *B60N 2002/0272* (2013.01)

(58) Field of Classification Search
CPC ................................................... B60N 2/39
USPC ............ 296/65.05, 68.1, 65.08, 190.05; 180/89.15, 89.14; 248/371; 297/314
See application file for complete search history.

(56) References Cited

U.S. PATENT DOCUMENTS

| | | | |
|---|---|---|---|
| 224,905 A | 2/1880 | Hedges |
| 357,059 A | 2/1887 | Banks |
| 420,430 A | 2/1890 | Banks |
| 522,387 A | 7/1894 | Pederson |
| 937,922 A | 10/1909 | Burd |

(Continued)

FOREIGN PATENT DOCUMENTS

| | | | |
|---|---|---|---|
| CA | 515835 A | 8/1955 |
| DE | 2442766 A1 | 3/1976 |

(Continued)

OTHER PUBLICATIONS

International Search Report and Written Opinion dated Aug. 22, 2014 for International application No. PCT/US2014/034664.

(Continued)

*Primary Examiner* — Jason S Morrow
(74) *Attorney, Agent, or Firm* — Wolf, Greenfield & Sacks, P.C.

(57) ABSTRACT

A seat system for a vehicle includes a seat having a seat bottom on which a person can sit. An intermediate support structure is secured to the seat and the vehicle which allows the seat to rotate relative to the vehicle. An actuator can interact with the seat to cause the seat to rotate relative to the vehicle. One or more sensors can each measure an aspect of motion. A processor can (i) receive input from each of the one or more sensors, (ii) determine from this input a measure of rotation of the vehicle away from a nominal, level horizontal orientation, and (iii) utilize the input to determine a desired rotation of the seat. An angle that the seat has been rotated away from a nominal, level orientation is more than insubstantially larger than an angle that the vehicle has rotated away from a nominal, level horizontal orientation.

48 Claims, 9 Drawing Sheets

(56) References Cited

U.S. PATENT DOCUMENTS

| | | | |
|---|---|---|---|
| 1,093,042 A | 4/1914 | Etherington |
| 1,281,921 A | 10/1918 | Etherington |
| 1,398,935 A | 11/1921 | Miller |
| 1,429,979 A | 9/1922 | Spanenberg |
| 2,140,423 A | 12/1938 | Frees |
| 2,284,352 A | 5/1942 | Zank |
| 2,370,014 A | 2/1945 | Cunningham |
| 2,444,604 A | 7/1948 | Hawkins |
| 2,489,981 A | 11/1949 | Rose |
| 2,572,910 A | 10/1951 | Brown |
| 2,591,144 A | 4/1952 | Fleischer |
| 2,664,146 A | 12/1953 | Jackson |
| 2,681,686 A | 6/1954 | Sheron |
| 2,707,986 A | 5/1955 | Johnson |
| 2,731,074 A | 1/1956 | Steinle |
| 2,770,286 A | 11/1956 | Weller |
| 2,770,287 A | 11/1956 | Christenson |
| 2,939,512 A | 6/1960 | Pohl |
| 2,949,153 A | 8/1960 | Hickman |
| 2,966,937 A | 1/1961 | Rydberg |
| 2,984,290 A | 5/1961 | Miller |
| 3,006,594 A | 10/1961 | Gruendler |
| 3,021,107 A | 2/1962 | Salo |
| 3,288,523 A | 11/1966 | Bollden et al. |
| 3,295,224 A | 1/1967 | Cappel |
| 3,315,934 A | 4/1967 | Taylor |
| 3,341,165 A | 9/1967 | Taylor |
| 3,393,009 A | 7/1968 | Tart |
| 3,464,657 A | 9/1969 | Bullard |
| 3,466,089 A | 9/1969 | Stueckle |
| 3,583,758 A | 6/1971 | Radford |
| 3,632,076 A | 1/1972 | Rogers, Jr. |
| 3,703,999 A | 11/1972 | Forys et al. |
| 3,713,617 A | 1/1973 | Bogdan et al. |
| 3,741,511 A | 6/1973 | Streeter |
| 3,863,587 A | 2/1975 | Bosnich |
| 3,917,211 A | 11/1975 | Daunderer et al. |
| 3,952,979 A | 4/1976 | Hansen |
| 4,057,213 A | 11/1977 | Kokkila |
| 4,095,770 A | 6/1978 | Long |
| 4,183,492 A | 1/1980 | Meiller |
| 4,254,990 A | 3/1981 | Kelley |
| 4,273,461 A | 6/1981 | Kjellstrand et al. |
| 4,401,290 A | 8/1983 | Butler |
| 4,408,744 A | 10/1983 | Thompson |
| 4,425,863 A | 1/1984 | Cutler |
| 4,500,062 A | 2/1985 | Sandvik |
| 4,500,076 A | 2/1985 | Rova |
| 4,515,337 A | 5/1985 | Torras |
| 4,531,699 A | 7/1985 | Pinson |
| 4,615,504 A | 10/1986 | Sandercock |
| 4,636,001 A | 1/1987 | Weyenberg |
| 4,643,385 A | 2/1987 | Sandercock |
| 4,907,153 A | 3/1990 | Brodsky |
| 5,000,415 A | 3/1991 | Sandercock |
| 5,022,708 A | 6/1991 | Nordella et al. |
| 5,044,455 A | 9/1991 | Tecco et al. |
| 5,046,694 A | 9/1991 | Martin |
| 5,054,739 A | 10/1991 | Wallin |
| 5,294,085 A | 3/1994 | Lloyd et al. |
| 5,310,157 A | 5/1994 | Platus |
| 5,321,617 A | 6/1994 | Mori et al. |
| 5,372,347 A | 12/1994 | Minnich |
| 5,460,427 A | 10/1995 | Serber |
| 5,536,059 A | 7/1996 | Amirouche |
| 5,570,929 A | 11/1996 | Glockl |
| 5,590,930 A | 1/1997 | Glockl |
| 5,605,462 A | 2/1997 | Denne |
| 5,765,803 A | 6/1998 | Graham |
| 5,822,813 A | 10/1998 | Powell |
| 5,857,535 A | 1/1999 | Brooks |
| 5,941,920 A | 8/1999 | Schubert |
| 5,992,933 A | 11/1999 | West |
| 6,026,920 A | 2/2000 | Obeda et al. |
| 6,035,980 A | 3/2000 | Fujita et al. |
| 6,059,253 A | 5/2000 | Koutsky et al. |
| 6,068,280 A * | 5/2000 | Torres ............. 280/304.1 |
| 6,135,225 A * | 10/2000 | Barsic ............. 180/89.14 |
| 6,152,828 A | 11/2000 | Tomita et al. |
| 6,206,335 B1 | 3/2001 | Huber et al. |
| 6,257,663 B1 | 7/2001 | Swierczewski |
| 6,273,389 B1 | 8/2001 | Carlgren |
| 6,398,303 B1 | 6/2002 | Herrmann et al. |
| 6,637,816 B2 | 10/2003 | Pavlov et al. |
| 6,755,270 B2 * | 6/2004 | Saarinen ............. 180/89.13 |
| 6,857,674 B2 | 2/2005 | Chareyre |
| 7,044,553 B2 | 5/2006 | Ropp |
| 7,044,559 B2 | 5/2006 | Ropp et al. |
| 7,093,900 B1 | 8/2006 | Schon |
| 7,100,983 B1 | 9/2006 | Gant |
| 7,281,749 B2 | 10/2007 | Yamada et al. |
| 7,490,903 B2 | 2/2009 | Ruppe |
| 7,543,792 B1 | 6/2009 | Ursel et al. |
| 7,614,699 B2 * | 11/2009 | Torres et al. ............. 297/344.14 |
| 7,647,999 B2 | 1/2010 | Geiser |
| 7,686,390 B2 | 3/2010 | Dennis |
| 7,822,523 B2 | 10/2010 | Yoshida et al. |
| 7,987,032 B2 | 7/2011 | Uenuma et al. |
| 8,146,899 B2 | 4/2012 | Hiser |
| 8,246,020 B2 | 8/2012 | Nakamura et al. |
| 8,308,216 B2 | 11/2012 | Bertozzi |
| 8,607,910 B2 | 12/2013 | Haller et al. |
| 9,387,852 B2 | 7/2016 | Meitinger et al. |
| 2002/0135214 A1 | 9/2002 | Ursel et al. |
| 2004/0056758 A1 | 3/2004 | Schwartz |
| 2005/0073184 A1 | 4/2005 | Tsuji et al. |
| 2006/0061178 A1 | 3/2006 | Billger et al. |
| 2006/0261647 A1 | 11/2006 | Maas et al. |
| 2007/0272818 A1 * | 11/2007 | Ruppe ............. 248/371 |
| 2007/0276568 A1 | 11/2007 | Tozu |
| 2008/0054150 A1 | 3/2008 | Stuby |
| 2008/0154460 A1 | 6/2008 | Uenuma et al. |
| 2009/0091171 A1 | 4/2009 | Valverde Fernandez et al. |
| 2010/0066142 A1 | 3/2010 | Gross et al. |
| 2010/0102493 A1 | 4/2010 | Deml et al. |
| 2010/0127844 A1 | 5/2010 | Chen |
| 2010/0308175 A1 | 12/2010 | Bertrand et al. |
| 2010/0313695 A1 | 12/2010 | Valasek |
| 2011/0118944 A1 | 5/2011 | Tzipman |
| 2011/0254330 A1 | 10/2011 | Lich et al. |
| 2011/0276233 A1 | 11/2011 | Lofstrand |
| 2012/0049421 A1 | 3/2012 | Haller et al. |
| 2012/0145875 A1 | 6/2012 | Haller et al. |
| 2012/0161485 A1 | 6/2012 | Stockwell |
| 2012/0193941 A1 | 8/2012 | Husson |
| 2012/0222928 A1 | 9/2012 | Haller et al. |
| 2012/0267503 A1 | 10/2012 | Gribble |
| 2012/0282588 A1 | 11/2012 | Stevens et al. |
| 2013/0131923 A1 * | 5/2013 | Tzipman ............. 701/38 |

FOREIGN PATENT DOCUMENTS

| | | |
|---|---|---|
| DE | 2602133 A1 | 7/1977 |
| DE | 2709123 A1 | 9/1977 |
| DE | 2803271 A1 | 8/1979 |
| DE | 2851129 A1 | 6/1980 |
| DE | 3715128 A1 | 11/1988 |
| DE | 3905338 A1 | 8/1990 |
| DE | 4115639 A1 | 11/1992 |
| DE | 4201412 A1 | 7/1993 |
| DE | 4207880 A1 | 9/1993 |
| DE | 4337019 A1 | 5/1995 |
| DE | 29518457 U1 | 2/1996 |
| DE | 4441892 A1 | 5/1996 |
| DE | 19503660 A1 | 7/1996 |
| DE | 19915003 A1 | 10/2000 |
| DE | 10012035 A1 | 9/2001 |
| DE | 10046745 C1 | 2/2002 |
| DE | 10046185 A1 | 4/2002 |
| DE | 10136229 A1 | 2/2003 |
| DE | 10252204 B3 | 2/2004 |
| DE | 102004058503 A1 | 1/2006 |
| DE | 102007023283 A1 | 11/2008 |
| DE | 102007033306 A1 | 1/2009 |

(56) References Cited

FOREIGN PATENT DOCUMENTS

| | | |
|---|---|---|
| DE | 102008030102 A1 | 12/2009 |
| DE | 102008064466 A1 | 7/2010 |
| DE | 102009033802 A1 | 9/2010 |
| DE | 102009048902 A1 | 4/2011 |
| EP | 380670 A1 | 8/1990 |
| EP | 401092 A1 | 12/1990 |
| EP | 437130 A1 | 7/1991 |
| EP | 636512 A1 | 2/1995 |
| EP | 648641 A1 | 4/1995 |
| EP | 677003 A1 | 10/1995 |
| EP | 758301 A1 | 2/1997 |
| EP | 780073 A1 | 6/1997 |
| EP | 920823 A2 | 6/1999 |
| EP | 1090568 A2 | 4/2001 |
| EP | 1228924 A2 | 8/2002 |
| EP | 1577155 A2 | 9/2005 |
| EP | 1577156 A2 | 9/2005 |
| EP | 1725786 A1 | 11/2006 |
| EP | 2431218 A1 | 3/2012 |
| EP | 2 431 218 B1 | 3/2016 |
| ES | 2184564 A1 | 4/2003 |
| FR | 717286 A | 1/1932 |
| FR | 2293332 A1 | 7/1976 |
| FR | 2307672 A1 | 11/1976 |
| FR | 2418721 A1 | 9/1979 |
| FR | 2472491 A1 | 7/1981 |
| FR | 2618392 A1 | 1/1989 |
| FR | 2761311 A1 | 10/1998 |
| FR | 2775245 A1 | 8/1999 |
| FR | 2887189 A1 | 12/2006 |
| GB | 755171 A | 8/1956 |
| GB | 1139359 A | 1/1969 |
| GB | 1432614 A | 4/1976 |
| GB | 1571574 A | 7/1980 |
| GB | 2420494 A | 5/2006 |
| GB | 2438826 A | 12/2007 |
| JP | 57084232 A | 5/1982 |
| JP | 62013225 B | 3/1987 |
| JP | 1015417 | 3/1989 |
| JP | 2024232 A | 1/1990 |
| JP | 03253435 A | 11/1991 |
| JP | H0556576 U | 7/1993 |
| JP | 5199930 A | 8/1993 |
| JP | H0580863 U | 11/1993 |
| JP | H0633785 U | 5/1994 |
| JP | 7032920 A | 2/1995 |
| JP | 7047876 A | 2/1995 |
| JP | 07117532 A | 5/1995 |
| JP | 8040295 A | 2/1996 |
| JP | 8058453 A | 3/1996 |
| JP | 8142728 A | 6/1996 |
| JP | 08197990 A | 8/1996 |
| JP | 2665814 B2 | 10/1997 |
| JP | 10028779 A | 2/1998 |
| JP | 2000313266 A | 11/2000 |
| JP | 2001142386 A | 5/2001 |
| JP | 2001163098 A | 6/2001 |
| JP | 3239910 B2 | 12/2001 |
| JP | 3513898 B2 | 3/2004 |
| JP | 2005022587 A | 1/2005 |
| JP | 3746352 B2 | 2/2006 |
| JP | 2006103423 A | 4/2006 |
| JP | 4406979 B2 | 2/2010 |
| JP | 4816108 B2 | 11/2011 |
| JP | 4889877 B2 | 3/2012 |
| KR | 101008410 B1 | 1/2011 |
| SU | 831642 A1 | 5/1981 |
| WO | 8302593 A1 | 8/1983 |
| WO | 8906198 A1 | 7/1989 |
| WO | 9316894 A1 | 9/1993 |
| WO | 9502521 A1 | 1/1995 |
| WO | 9921730 A2 | 5/1999 |
| WO | 9928146 A1 | 6/1999 |
| WO | 9956983 A1 | 11/1999 |
| WO | 200012350 A1 | 3/2000 |
| WO | 200164472 A1 | 9/2001 |
| WO | 200264398 A1 | 8/2002 |
| WO | 200532877 A1 | 4/2005 |
| WO | 200758572 A1 | 5/2007 |
| WO | 2007058572 A1 | 5/2007 |
| WO | 200954788 A1 | 4/2009 |
| WO | 201030223 A1 | 3/2010 |
| WO | 201076348 A1 | 7/2010 |

OTHER PUBLICATIONS

DiGiovine, Carmen P., et. al, Whole-Body Vibration During Manual Wheelchair Propulsion With Selected Seat Cushions and Back Supports, IEEE Transactions on Neural Systems and Rehabilitation Engineering, vol. 11, No. 3, Sep. 2003.

Office Action with Office Action Search Report dated Sep. 20, 2016 by the Patent Office of the People's Republic of China for corresponding CN Application No. 2014800297961.

English Translation of Office Action dated Sep. 20, 2016 by the Patent Office of the People's Republic of China for corresponding CN Application No. 2014800297961.

\* cited by examiner

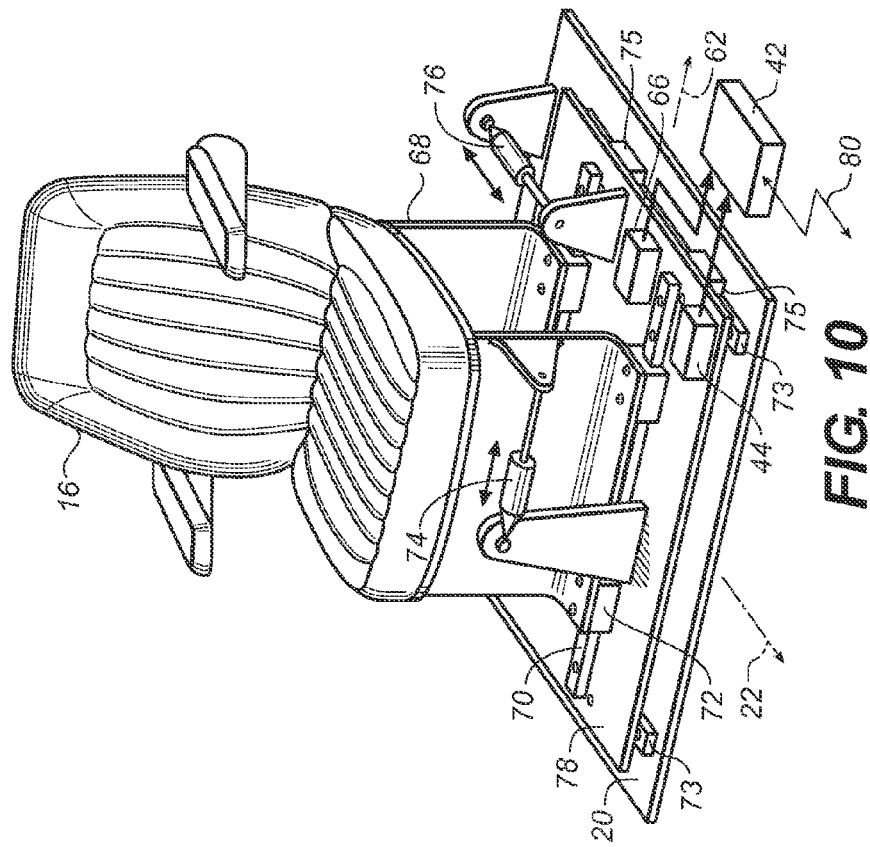
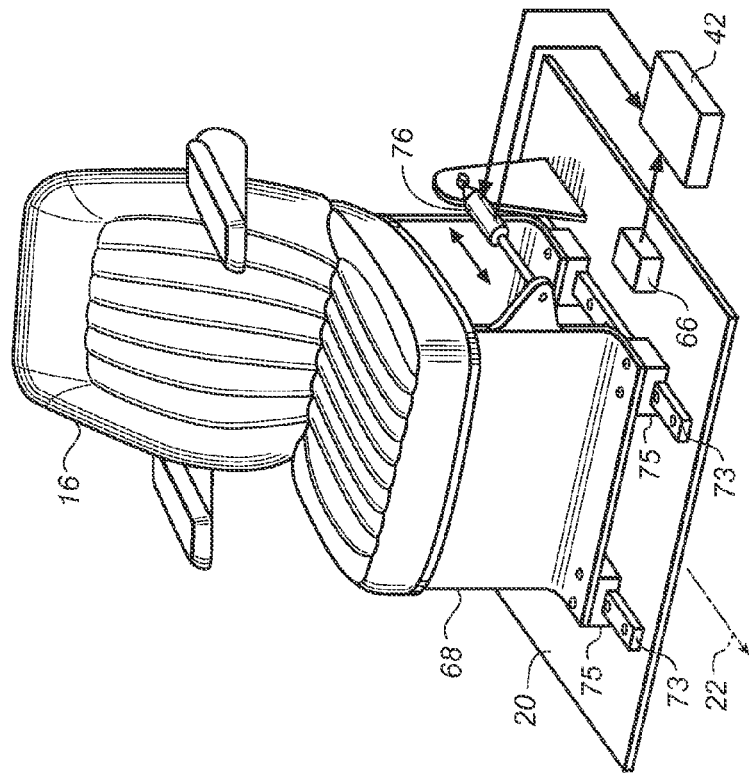
FIG. 10
FIG. 9

SEAT SYSTEM FOR A VEHICLE

BACKGROUND

This disclosure relates to a seat system for a vehicle. In an X, Y, Z coordinate system, a person can be subject to motion in six degrees of freedom. These degrees of freedom include rotation about the X, Y and Z axes, and translation substantially parallel to each of these axes. When traveling in a vehicle such as a farm tractor or a car, a person can be quite sensitive to vehicle rotations about roll and pitch axes. As such, passengers in vehicles with relatively stiff suspensions (e.g. farm tractors, sports cars) can be made uncomfortable when the vehicle starts rocking side-to-side and/or pitching back and forth due to an uneven surface over which the vehicle is traveling.

U.S. Pat. No. 5,857,535 discloses a low aspect self-propelled vehicle (1) operated by a driver (4) sitting on top of it, has its seat (7) supported from beneath by a flange (12) which is pivoted to tilt about a horizontal axis (15) in the mid-vertical plane of the vehicle. The spacing between the axis (15) and the seat (7) is sufficient to ensure that when the seat is tilted about the axis by operation of a tilt control mechanism (21), the center of seat also displaces a significant extent in the uphill direction of the slope. This reduces the downhill movement of the center-of-gravity (10) of the combination of vehicle plus driver, so that the risk of the vehicle toppling is reduced.

SUMMARY

In one aspect, a seat system for a vehicle includes a seat including a seat bottom on which a person can sit. A first imaginary reference vertical centerline passes through a body of a person who is sitting in the seat when both the seat and the vehicle are in a nominal, level horizontal orientation. An intermediate support structure is secured to the seat and the vehicle which allows the seat to move relative to the vehicle. A first actuator can interact with the seat to cause the seat to move relative to the vehicle. One or more sensors can each measure an aspect of motion. A processor can (i) receive input from each of the one or more sensors, and (ii) utilize the input to determine a desired movement of the seat relative to the vehicle such that a combined motion of the seat relative to the vehicle and the vehicle relative to earth results in motion of the person about a virtual pivot point located substantially along the reference vertical centerline.

Embodiments may include one or more of the following features. The motion of the vehicle relative to earth is a rotation of the vehicle about an axis. The virtual pivot point is located above the axis about which the vehicle is rotating. The virtual pivot point is located above a floor of the vehicle. The virtual pivot point is located above a level where relative motion of the seat with respect to the vehicle occurs. The processor controls motion of the seat in order to minimize displacement of the virtual pivot point along the reference vertical centerline as the vehicle is rotated. The virtual pivot point is located about 1-4 feet above a surface of the seat bottom on which the person can sit. The virtual pivot point is located about 2-3 feet above a surface of the seat bottom on which the person can sit. The seat is pivotally connected to the vehicle at or near a floor of the vehicle. The actuator causes the seat to rotate about a second axis in an opposite sense relative to the rotation of the vehicle about the first axis. The seat is able to rotate about a second axis which is non-intersecting with a horizontal plane. The second axis is substantially parallel to a direction in which the vehicle is moving when the vehicle is traveling in a straight line. The second axis is substantially perpendicular to a direction in which the vehicle is moving when the vehicle is traveling in a straight line. The seat system can further include a second actuator. The seat is able to rotate about a third axis which is non-intersecting with the horizontal plane. The first and second actuators are able to cause the seat to rotate about the second and third axes.

Embodiments may also include one or more of the following features. The second axis is substantially parallel to a direction in which the vehicle is moving when the vehicle is traveling in a straight line. The third axis is substantially perpendicular to a direction in which the vehicle is moving when the vehicle is traveling in a straight line. The second and third axes are substantially orthogonal to each other. The seat is able to translate substantially parallel to a second axis which is non-intersecting with a horizontal plane. The second axis is substantially parallel to a direction in which the vehicle is moving when the vehicle is traveling in a straight line. The second axis is substantially perpendicular to a direction in which the vehicle is moving when the vehicle is traveling in a straight line. The seat system further includes a second actuator. The seat is able to translate substantially parallel to a third axis which is non-intersecting with the horizontal plane. The first and second actuators are able to cause the seat to translate substantially parallel to the second and third axes. The second axis is substantially parallel to a direction in which the vehicle is moving when the vehicle is traveling in a straight line. The third axis is substantially perpendicular to a direction in which the vehicle is moving when the vehicle is traveling in a straight line. The one or more sensors include a sensor for detecting a roll rate of the vehicle about the first axis which is substantially parallel to a direction in which the vehicle is moving when the vehicle is traveling in a straight line. The one or more sensors includes a sensor for detecting a roll rate of the seat about a second axis which is substantially parallel to a direction in which the vehicle is moving when the vehicle is traveling in a straight line. The one or more sensors includes a sensor for detecting a lateral acceleration in a direction that is substantially perpendicular to a direction in which the vehicle is moving when the vehicle is traveling in a straight line and non-intersecting with the horizontal plane. The lateral acceleration sensor detects the lateral acceleration of the seat. The lateral acceleration sensor detects the lateral acceleration of the vehicle.

In another aspect, a method of controlling motion of a seat relative to a vehicle to which the seat is connected, includes the steps of receiving input at a processor from one or more sensors which can each measure an aspect of motion, and utilizing the processor to determine from the input a desired motion of the seat about a first axis which is substantially parallel to a direction in which the vehicle is moving when the vehicle is traveling in a straight line. As such, if a person were sitting in the seat, a combined motion of the vehicle relative to earth and the seat relative to the vehicle will result in that person being rotated about a position associated with their head or higher to substantially reduce side-to-side movement of the person's head. A signal is issued from the processor to cause an actuator to rotate the seat about the first axis to achieve the desired motion of the seat about the first axis.

Embodiments may include any of the above features and/or the following. The seat includes a seat bottom and a seat back which is connected to the seat bottom. The one or more sensors includes a sensor for detecting a roll rate of the vehicle about a second axis which is substantially parallel with the first axis. The one or more sensors includes a sensor for detecting a roll rate of the seat about the first axis. The one or more sensors includes a sensor for detecting a lateral acceleration in a direction that is substantially perpendicular to the first axis and non-intersecting with a horizontal plane. The lateral acceleration sensor detects the lateral acceleration of the seat. The lateral acceleration sensor detects the lateral acceleration of the vehicle. The processor receives an input that is indicative of a position of the actuator which is correlated to a position of the seat about the first axis.

In another aspect, a seat system for a vehicle includes a seat having a seat bottom on which a person can sit. An intermediate support structure is secured to the seat and the vehicle which allows the seat to rotate relative to the vehicle. An actuator can interact with the seat to cause the seat to rotate relative to the vehicle. One or more sensors can each measure an aspect of motion. A processor can (i) receive input from each of the one or more sensors, (ii) determine from this input a measure of rotation of the vehicle away from a nominal, level horizontal orientation, and (iii) utilize the input to determine a desired rotation of the seat. An angle that the seat has been rotated away from a nominal, level orientation is more than insubstantially larger than an angle that the vehicle has rotated away from a nominal, level horizontal orientation.

In a still further aspect, a method of controlling motion of a person relative to a vehicle in which the person is located includes providing a seat with a seat bottom on which the person can sit. Motion of the vehicle relative to earth is a rotation of the vehicle about an axis. A first imaginary reference vertical centerline passes through a body of the person who is sitting in the seat when both the seat and the vehicle are in a nominal, level horizontal orientation. The seat is secured to the vehicle. An aspect of motion is measured with one or more sensors. A processor is operated to (i) receive input from each of the one or more sensors, and (ii) utilize the input to determine a desired movement of a first portion of the vehicle relative to a second portion of the vehicle such that a combined motion of the second portion of the vehicle relative to the first portion of the vehicle and the first portion of the vehicle relative to earth results in motion of the person about a virtual pivot point located substantially along the reference vertical centerline.

Embodiments may include any of the above features and/or the following. An intermediate support structure is secured to the seat and the second portion of the vehicle which allows the seat to move relative to the second portion of the vehicle. A first actuator is connected between the seat and the second portion of the vehicle which can be operated to cause the seat to move relative to the second portion of the vehicle. The second portion of the vehicle includes a cab of the vehicle. The seat is able to be moved relative to the cab. The cab is able to be moved relative to the first portion of the vehicle.

BRIEF DESCRIPTION OF THE DRAWINGS

FIG. 9 is a perspective view of another example of a seat system in which the seat can be translated substantially parallel to a second axis;
FIG. 10 is a perspective view of another example of a seat system in which the seat can be translated substantially parallel to two axes.

DETAILED DESCRIPTION

The description below relates to a seat system for a vehicle. When a vehicle is rocked from side-to-side and/or fore/aft due to a disturbance in the road surface, the driver of the vehicle also experiences this motion. With the seat system discussed below, when the vehicle is rocked in one direction, the seat is rotated or translated relative to the vehicle in the opposite direction. As a result, acceleration of the driver's head in a horizontal direction is substantially reduced which results in a more pleasing driving experience for the driver.

Figure 1B:
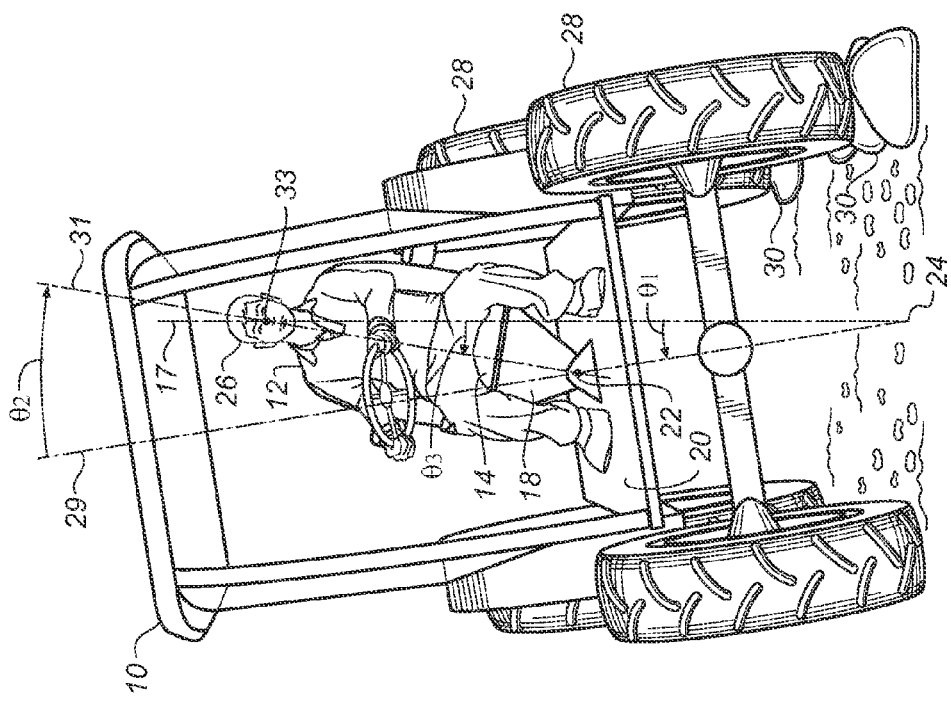
FIG. 1B shows the tractor of FIG. 1 in a tilted orientation.
Figure 1A:
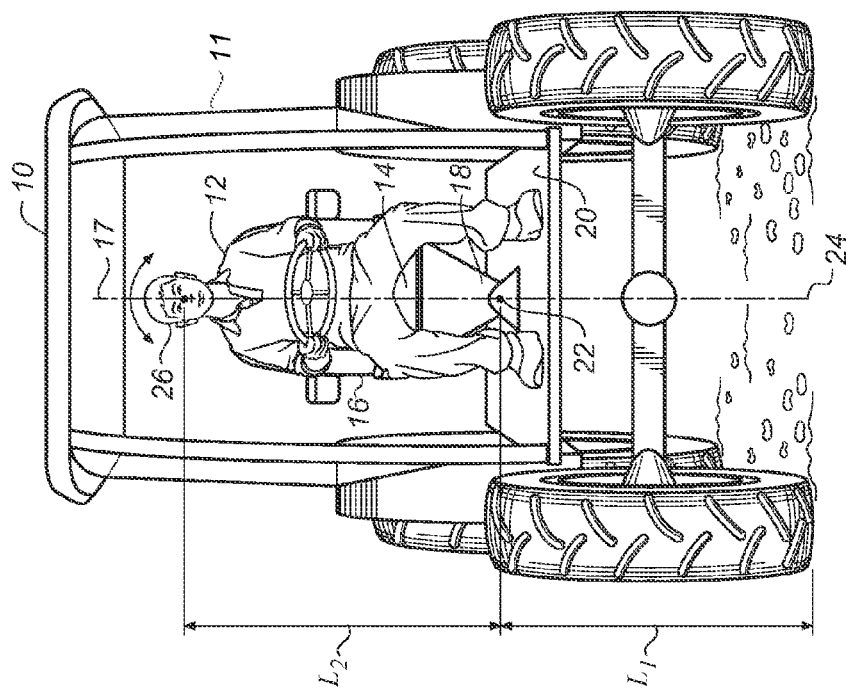
FIG. 1A is front view of a tractor.

Turning to FIG. 1A, a vehicle 10 in the form of a tractor is shown driving in a straight line on a substantially level road surface. Not all portions of the vehicle are shown in order to facilitate this description. A person 12 is sitting on a bottom 14 of a seat 16 which is part of a seat system that will be described in further detail below. The person is sitting in a substantially vertical orientation along an imaginary reference vertical centerline 17 which passes through the body of the person 12 who is sitting in the seat 16 and an axis 22 (explained further below). In this example the vertical centerline 17 bisects the person 12 and seat 16 when both the seat and the vehicle are in a nominal, level horizontal orientation as shown in FIG. 1. This is because the seat system is substantially symmetrical as viewed in FIG. 1A. In other types of vehicles the seat system may be located to the left or right of the vertical centerline 17.

An intermediate support structure 18 is secured to the seat 16 and to a floor 20 of the vehicle 10 (structure 18 may be considered part of the seat 16). The intermediate support structure 18 allows the seat 16 to move/rotate relative to the vehicle about an axis 22 which is substantially parallel to a direction in which the vehicle 10 is moving when the vehicle is traveling in a straight line (if the seat 16 can be rotated so that it is not facing forward, the axis 22 may be skewed relative to this direction). In this example the axis 22 is closer to the floor 20 than to the seat bottom 14, and is preferably non-intersecting with a horizontal plane. The axis 22 can be located lower or higher than shown, but the seat 16 is preferably connected to the vehicle 10 at or near the floor 20. The axis 22 is fixed relative to the vehicle 10. Factors such as the distance it is desired to move the person's head about the axis 22, and sway space requirements (interference between seat parts and other portions of a vehicle cab 11 as the seat rotates) can be considered in choosing the height of axis 22 above the floor 20. The vehicle 10 can roll about an axis 24 which is substantially parallel with the axis 22.

In an alternative example, an asymmetrical seat system may be used. This can occur if, for example, a relatively large user interface for controlling the vehicle is mounted on one of two arm rests of the seat system (e.g. as on some farm tractors). In order to balance the seat over the axis 22, the seat 16 (including the seat bottom 14) will be offset relative to the support structure 18. For example, as viewed in FIG. 1A, if the user interface is mounted on the left armrest, the seat 16 will be mounted to the support structure 18 in an offset position to the right of center so that the seat system is balanced over the axis 22. It is preferred that the vertical centerline 17 passes through the axis 22 and the center of gravity of the seat 16 when the vehicle 10 is oriented as shown in FIG. 1A. As such, with an asymmetrical seat system (e.g. the seat is offset to the right as viewed in FIG. 1A to offset the weight of a large user interface on the left armrest of the seat), the vertical centerline 17 may pass through a different portion of the body of the person 12 (e.g. through the left ear of the person 12 as viewed in FIG. 1A).

A distance $L_1$ represents the length between the axis 22 and the axis 24. A distance $L_2$ represents the length between the axis 22 and a center of a head 26 of the driver 12. The distance $L_2$ is preferably assumed to be associated with a human being of above average height who is sitting in the seat 16 as opposed to setting $L_2$ to be associated with a human being of average or below average height who is sitting in the seat 16. Preferably, the top end of $L_2$ will reside at or above a position associated with a person's head who is sitting in the seat. It is preferred that $L_2$ will be in the range of about 3-5 feet.

Referring to FIG. 1B, the left tires 28 of the vehicle 10 have hit obstacles 30 while the vehicle travels in a straight line which causes the vehicle to move relative to earth (the surface over which the vehicle is traveling). As a result, the vehicle 10 has rotated counter-clockwise (when viewed from the front here and in like descriptions below) about the bottom of the right tires of the vehicle. Rotation about an axis 24 is an acceptable small angle approximation for the rotation of the vehicle 10 about the bottom of the right tires and is used for symmetry reasons. The vehicle 10 has approximately rotated by an angle $\theta_1$ which is the angle between the vertical centerline 17 and a vehicle centerline 29. If the seat 16 is not secured in the center of the vehicle 10 as in FIG. 1A (meaning the seat is positioned to one side or the other of center), then $\theta_1$ is determined by the rotation of the vehicle centerline 29 from the nominal position in FIG. 1A to a rotated position (e.g. in FIG. 1B). As the vehicle rotates counter-clockwise, the seat is automatically rotated clockwise (in the opposite direction to the roll of the vehicle) by an actuator (discussed in further detail below) about the axis 22 by an angle $\theta_2$ which is the angle between the vehicle centerline 29 and a seat centerline 31. The actuator causes the seat 16 to rotate about the axis 22 (pivot point) in an opposite sense relative to the rotation of the vehicle. Rotation of the seat 16 about the axis 22 in FIG. 1B is clockwise for a counterclockwise rotation of the vehicle 10 (e.g. about the axis 24). More details of how the seat is automatically rotated will be provided below.

The angle $\theta_2$ is calculated as follows by the processor: $\theta_2 = \theta_1 \times (1 + L_1/L_2)$. This equation shows why locating the axis 22 close to the floor 20 is preferable. If $L_1$ increases relative to $L_2$ (the axis 22 is moved up away from the floor 20), $\theta_2$ increases. This means the seat 16 would have to be rotated through a larger angle to compensate for a fixed amount of vehicle roll as the axis 22 is moved up. This equation also shows that in this example $\theta_2$ will always be more than insubstantially larger than $\theta_1$. As a result, the person 12 is rotated about a position associated with their head 26 to substantially reduce or minimize side-to-side and/or front/back (discussed below) movement (i.e. acceleration in a horizontal direction) of the person's head. Preferably the head 26 remains substantially on the original vertical centerline 17. It should be noted that if the vehicle rotates through too large an angle (e.g. about axis 24), the seat may be rotated to its travel limit and not be able to rotate further to address the full angle of rotation of the vehicle. This would result in the head 26 of the person 12 not remaining on the vertical centerline 17. In an alternative example, the axis 22 can be located below the floor 20. A hole can be created in the floor, and the support structure 18 can be made longer in a vertical direction. This causes $L_1$ to decrease and to $L_2$ to increase, resulting in a relatively smaller $\theta_2$ (see the equation above)

The person 12 has not just been rotated so that they remain in a vertical position: they have been rotated beyond a vertical position. In other words, a combined motion of the seat 16 relative to the vehicle 10 and the vehicle 10 rotating (e.g. about the axis 24) results in motion of the person 12 about a virtual pivot point 33 located substantially along the reference vertical centerline 17. The virtual pivot point 33 is the intersection of the reference vertical centerline 17 with the seat centerline 31 as the seat 16 is displaced in space relative to earth. The virtual pivot point 33 is located at least above the location of the axis 24 (the vehicle rotation center). Preferably, the virtual pivot point 33 is located above the floor 20 of the vehicle 10. Even more preferably, the virtual pivot point 33 is located above the axis 22 (or the level where relative translation of the seat 16 with respect to the vehicle 10 occurs). Still further preferably, the virtual pivot point 33 is located above a position of a torso of the person 12 (assuming this person is of nominal height) when seated in the seat. Yet further preferably, the virtual pivot point 33 is located at or above a position of a center of the head of the person 12 (assuming this person is of nominal height) when seated in the seat. Preferably the virtual pivot point is about 1-4 feet above a surface of the seat bottom 14 on which the person can sit. More preferably the virtual pivot point is about 2-3 feet above a surface of the seat bottom 14 on which the person can sit. In FIG. 1B the virtual pivot point 33 is located at approximately the center of the head of the person 12. Another way to describe the motion of the person 12 is that they are like a swinging pendulum with the center of their head being the pivot point. A third angle $\theta_3$ is the absolute angle of rotation of the seat off the vertical centerline 17 (more discussion is provided below relative to $\theta_3$).

Figure 2:
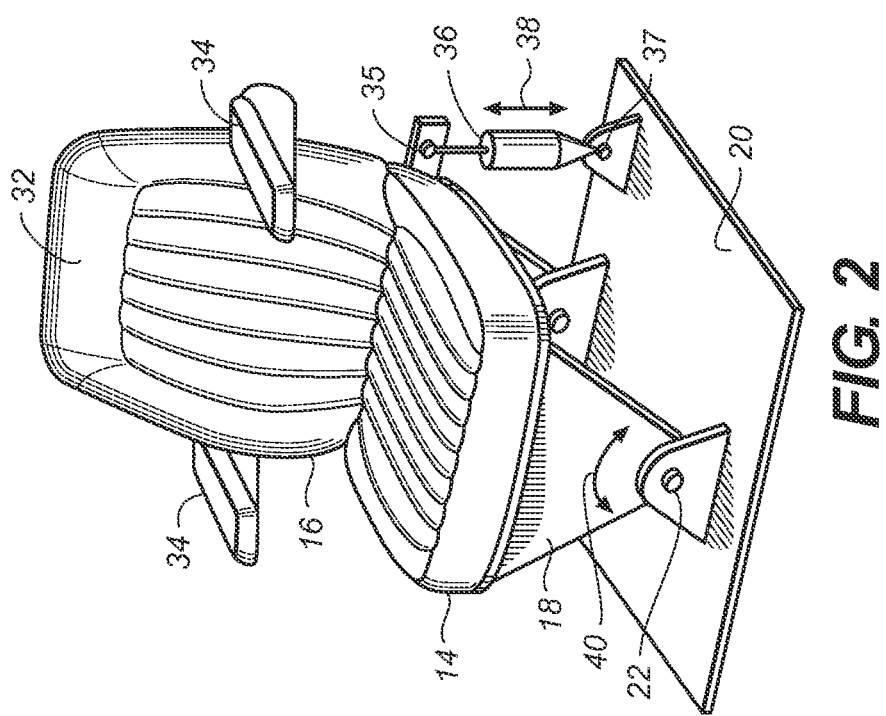
FIG. 2 is a perspective view of a seat used in the tractor of FIG. 1A.

With reference to FIG. 2, the seat 16 is shown with its bottom 14 and a seat back 32 which is connected to the bottom 14. A pair of arms 34 extend forward from the seat back 32. An advantage of this seat system is that any impact of the arms 34 against a torso of the person 12 due to side-to-side rocking of the vehicle 10 will be substantially reduced (or minimized). A similar improvement will occur on the seat back whereby the lateral translation of the seat back relative to a person's back will also be substantially reduced. A linear actuator 36 is pivotally connected to the seat 16 (at a location 35) and can interact with the seat 16 to cause the seat 16 to rotate about the axis 22. In this example, the linear actuator 36 is also pivotally connected to the floor 20 of the vehicle 10 at a location 37. The linear actuator 36 is extended or retracted in the direction of a two-headed arrow 38 to cause the seat to rotate about the axis 22 in the direction of a two-headed arrow 40. The linear actuator 36 can be, for example, an electromagnetic linear motor, a hydraulic cylinder, or a pneumatic cylinder. The linear actuator 36 instead can be some other type of actuator such as a rotary actuator (electromagnetic, hydraulic, or pneumatically powered) that is coupled between the seat 16 and the floor 20. Any type of actuator can be directly coupled to the seat or it may act thru some type of gear train, linkages or other transmission mechanism. The actuator 36 can be connected to a different portion of the seat 16 and a different portion of the vehicle 10 (other than the floor 20, e.g. a wall of the driver compartment). Control of the actuator is discussed below.

The seat 16 described above has only a single degree of freedom about the axis 22 (a roll axis) relative to the vehicle 10. This single degree of freedom could instead be about a pitch axis. In this case, the axis 22 is oriented side-to-side as viewed in FIG. 1A and allows the seat 16 to be controlled for backwards and forwards pitching. In another example, the seat 16 may be outfitted with one or more additional actuators (not shown) to provide movement of the seat in one or more additional degrees of freedom. For example, instead of mounting the intermediate support structure 18 to the floor 20, the intermediate support structure 18 can be mounted to a platform (not shown) which is moved up and down in the vertical direction by an additional actuator to reduce the vertical vibrations felt by the driver as the vehicle travels over a road (or this vertical actuator can be interposed between the structure 18 and the seat 16). An example of this type of vertical active suspension system is shown in U.S. Pat. No. 8,095,268 which is incorporated herein by reference. The vertical active suspension system can be operated independently of the rotating seat system (or the translating seat system described below). The $L_2$ distance (FIG. 1) will vary with the motions associated with a vertical isolation mechanism. This effect can be included in the processor calculations based on inputs from a sensor which detects a distance between the platform and the floor 20. In addition, the vertical isolation system can be used to offset any potential raising or lowering of the head of the person 12 due to the combined rotation of the vehicle 10 (e.g. relative to the ground), and rotation of the seat 16 relative to the vehicle 10.

Figure 3:
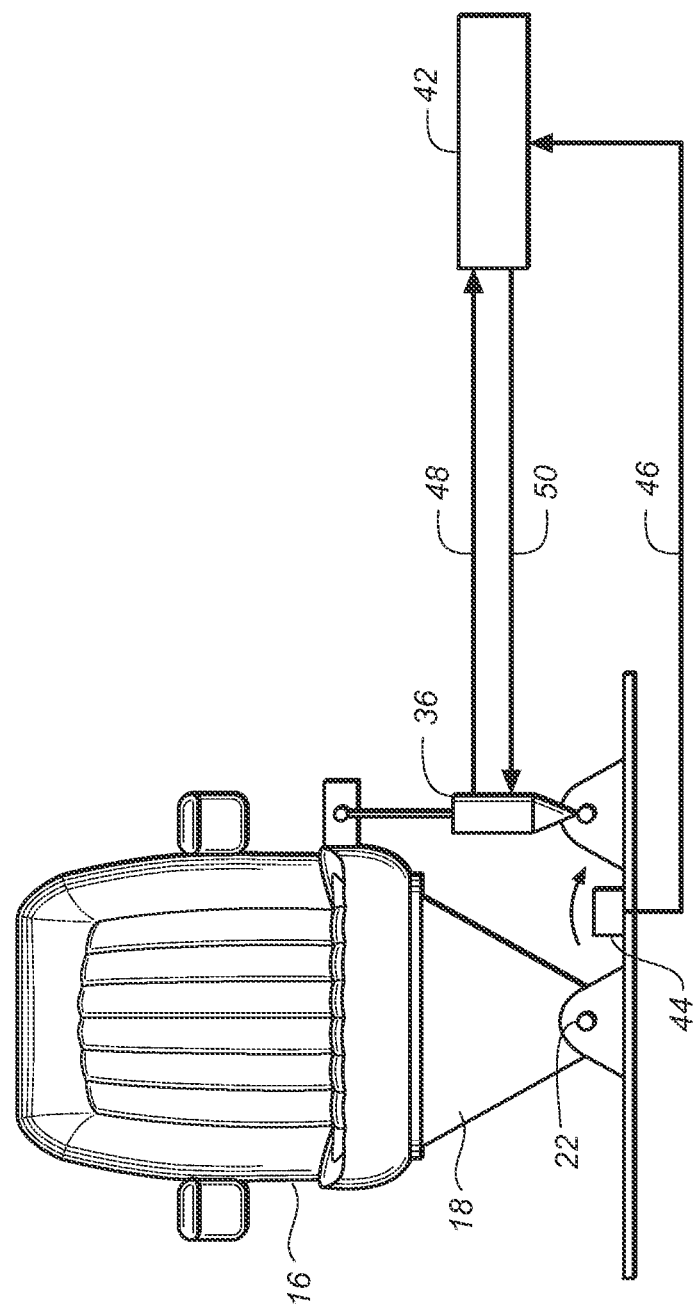
FIG. 3 is a front view of the seat of FIG. 2 secured to a floor of the tractor of FIG. 1A.

Turning to FIG. 3, operation of the actuator 36 is controlled by a processor 42. A sensor 44 can measure an aspect of motion which in this example is a roll rate of the vehicle 10. The processor 42 receives input from the sensor 44 in the form of roll rate data via a bus 46. The processor 42 calculates the integral of the roll rate data to determine an instantaneous roll angle $\theta_1$ (FIG. 1). The processor then plugs $\theta_1$ into the equation given above in paragraph 29 along with $L_2$ and $L_1$, and calculates $\theta_2$. Next, the processor 42 uses a lookup table to determine the desired actuator position in order to achieve the calculated $\theta_2$. Note that the processor 42 receives position data from the actuator 36 via a bus 48. The position data is indicative of a position of the actuator which is correlated to a position of the seat about the axis 22. As such, the processor is informed of the current position (e.g. displacement) of the actuator. It should be noted that the particular control law used by the processor to control $\theta_2$ is not important, and various control laws such as PI, PID, or other known control laws etc. can be used in the embodiments described herein.

The processor 42 then issues a command to the actuator 36 via a bus 50 which cause the actuator to move to the desired actuator position. By successively repeating these steps, the processor 42 utilizes input from the sensor 44 to determine a desired motion of the seat 16 about the axis 22, and then operates the actuator 36 to cause the desired motion of the seat 16 about that axis. This results in a substantial reduction (or minimizing) of the acceleration of a person's head sitting in the seat 16 in a substantially horizontal direction. Preferably the processor 42 controls motion of the seat 16 in order to reduce displacement of the virtual pivot point 33 along the reference vertical centerline 17 as the vehicle 10 is rotated (e.g. about the axis 24 in FIG. 1B). This example is advantageous in that it (a) is substantially insensitive to lateral accelerations caused by turning (when the vehicle makes a left or right turn) and gravity, and (b) requires minimal motion sensors. This arrangement assumes that there is a stationary roll center height (i.e. $L_1$ does not vary).

If it is desired to calculate $L_1$ continuously in real time as the vehicle is moving, a lateral accelerometer (not shown) can be provided on, for example, the vehicle 10 or the seat 16. It is preferable that this accelerometer is located at substantially the same height (or location) as the axis 22. The processor 42 receives inputs from the lateral accelerometer and the roll rate sensor 44, and then calculates $L_1$ using the equation $L_1$=lateral velocity/roll rate where the lateral velocity is calculated by integrating the lateral acceleration signal. It should be noted that preferably gravity correction is done on the output of any lateral accelerometers described in this application. This means that the component of gravity coupled into the lateral accelerometer as the vehicle 10 and/or seat 16 rotates is taken into consideration.

In an alternative way of controlling the position of the seat 16 about the axis 22 in FIG. 3, the angle $\theta_3$ (FIG. 1) is used instead of $\theta_2$. Once the processor determines the instantaneous roll angle $\theta_1$ as described above, the angle $\theta_3$ is determined by the equation $\theta_3=\theta_1\times(L_1/L_2)$. Next, the processor 42 uses a lookup table to determine the desired actuator position in order to achieve the calculated $\theta_3$. The processor 42 then issues a command to the actuator 36 via the bus 50 which cause the actuator to move to the desired actuator position in order to achieve the calculated $\theta_3$ angle. By successively repeating these steps, the processor 42 utilizes input from the sensor 44 to determine a desired motion of the seat 16 about the axis 22, and then operates the actuator 36 to cause the desired motion of the seat 16 about that axis. This control scheme can be done with a stationary roll center height $L_1$ or a time varying $L_1$ as described above.

Figure 4:
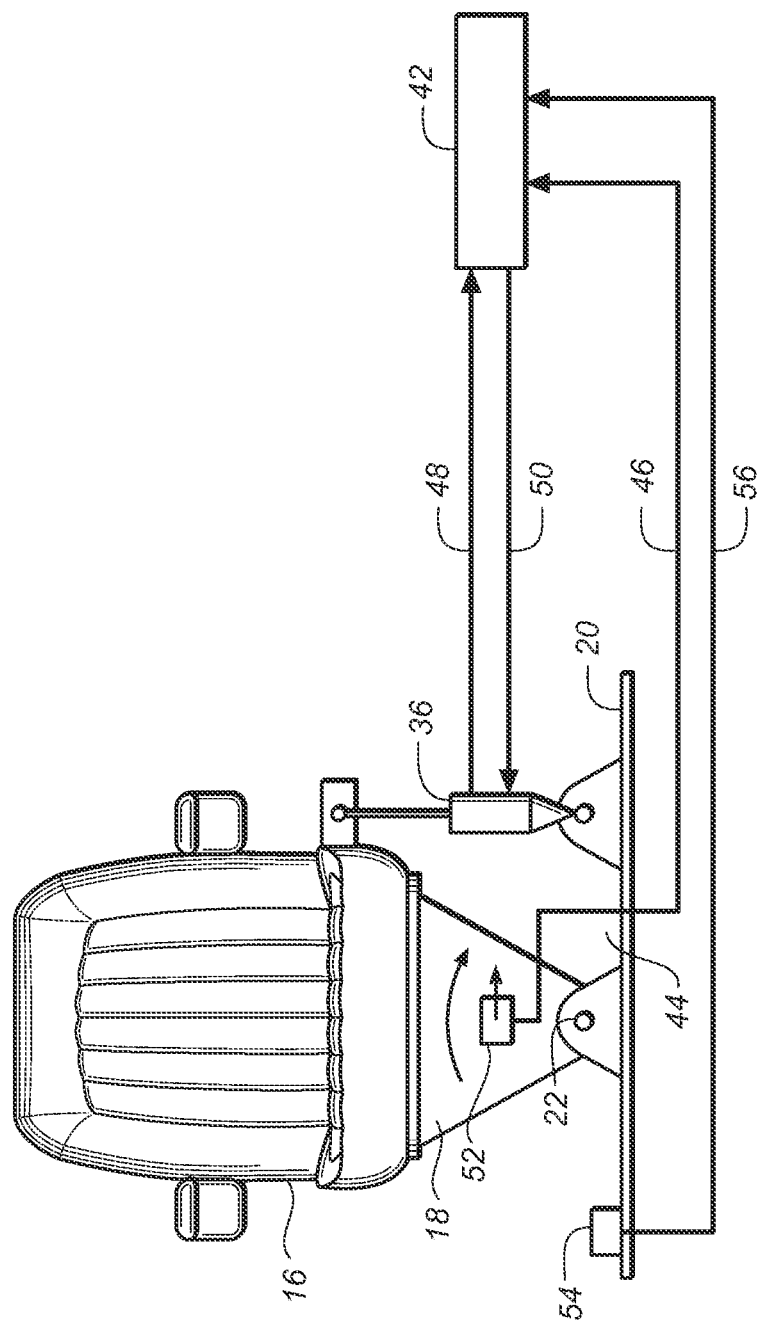
FIG. 4 is a front view of another example of a seat system.

With respect to FIG. 4, another example of a seat system is disclosed in which the vehicle roll rate sensor 44 of FIG. 3 has been removed, and a roll rate sensor 52 has been provided to rotate with the seat 16 as it is mounted on the intermediate support structure 18. The sensor 52 detects a roll rate of the seat 16 about the axis 22. A lateral accelerometer 54 has also been provided and is mounted on the floor 20 of the vehicle to detect a lateral acceleration of the vehicle.

The seat system can include a mechanism (not shown in the Figures) to lock the seat 16 in its home position (shown in FIG. 1A) under certain conditions. For example, if the engine is running but the vehicle is stopped with the transmission in park or neutral, or when the ignition of the vehicle is switched off, the actuator 36 will rotate the seat 16 to its home position. Alternatively, the seat system may include a centering spring (not shown in the Figures) that can also rotate the seat 16 towards its home position. A metal rod is then automatically inserted (e.g. by a solenoid or a spring) into a hole in the support structure 18 to lock the seat 16 in its home position. Then the electrical power to the actuator 36 is switched off.

Figure 5:
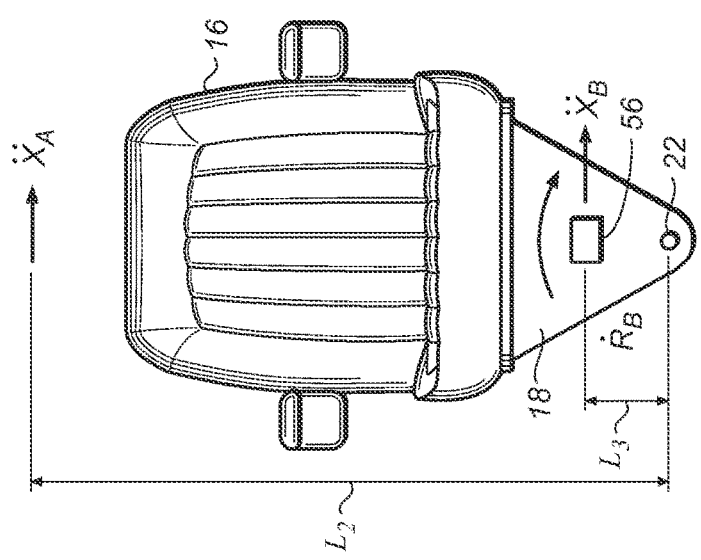
FIG. 5 is a modification of the seat of FIG. 4.

FIG. 5 shows a seat system which is a modification of the seat system of FIG. 4. The main difference is that the roll rate sensor 52 and lateral accelerometer 54 of FIG. 4 have been combined into a single sensor package 56 (mounted on the seat intermediate support structure 18). The processor 42

(not shown in FIG. 5) uses the inputs from the sensor package 56 in the same way as in FIG. 4. That is, the lateral acceleration of the axis 22 is given as $\ddot{X}_P=\ddot{X}_B-(d\dot{R}_B/dt \times L_3)$, where $\ddot{X}_B$ is the lateral acceleration measured by the accelerometer 54 (mounted to the seat in package 56), $d\dot{R}_B/dt$ is the rotational acceleration of the seat 16 which is obtained by differentiating the output $\dot{R}_B$ of the roll rate sensor 52 (mounted to the seat in package 56), and $L_3$ is the vertical distance between the axis 22 and the lateral accelerometer 54 in the package 56 (even if the sensor 54 is not vertically aligned with the axis 22). The calculated acceleration at the position of the head of a fictitious person who is sitting in the seat 16 is given as $\ddot{X}_A=\ddot{X}_P+(d\dot{R}_B/dt \times L_2)$. The processor 42 then utilizes the $\ddot{X}_A$ term to issue a command to the actuator 36 (not shown in FIG. 5) which operates to rotate the seat 16 about the axis 22 in an effort to drive the $\ddot{X}_A$ term to zero. This is done because we are trying to substantially reduce, minimize or eliminate lateral accelerations of a person's head who is sitting in seat 16. The equations used for the rotating seat examples in this application are effective for the relatively small angle rotations through which the seat is rotated.

In another example, the sensor package 56 is eliminated and a lateral accelerometer (not shown) is placed in a headrest (not shown) of the seat 16. The head rest, as is usual, can be adjusted to the height of the driver's head. The output of the lateral accelerometer is transmitted to the processor 42. The processor 42 uses the output from the lateral accelerometer to operate the actuator 36 in a way that substantially reduces, minimizes or eliminates acceleration of the drivers head in a horizontal direction (in this case, laterally). Gravity correction will need to be done on the output of the lateral accelerometer, and centrifugal forces from vehicle cornering need to be addressed by, for example, providing another accelerometer somewhere on the vehicle that can measure these centrifugal forces.

Figure 6:
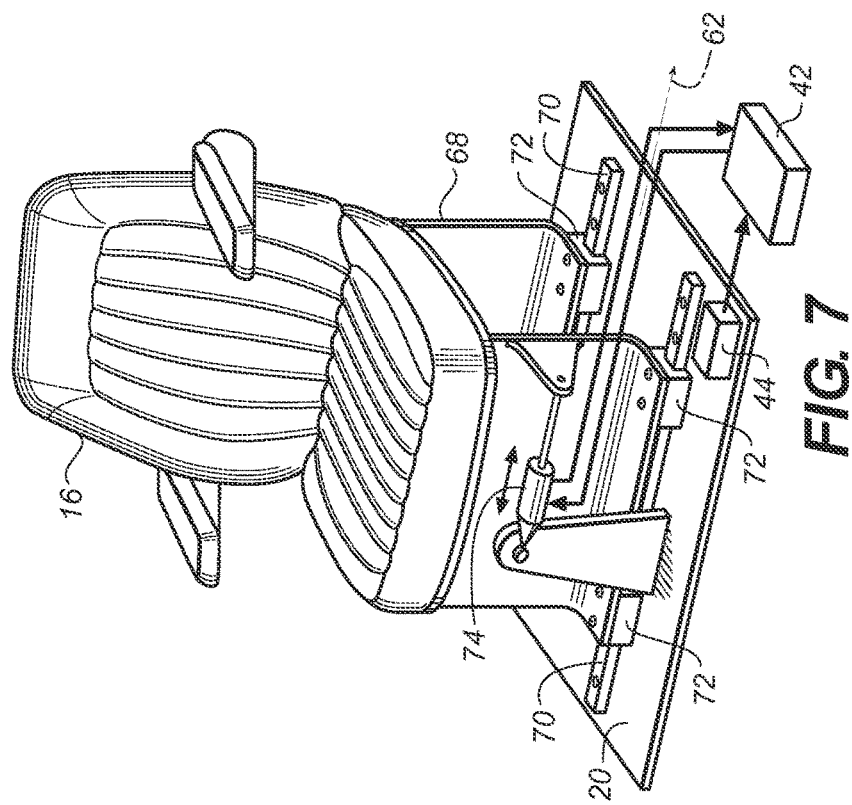
FIG. 6 is a perspective view of another example of a seat system in which the seat can be rotated about two axes.

Referring to FIG. 6, another example of a seat system is shown in which the seat 16 can be rotated about two different axes. This seat can address issues with the vehicle 10 pitching forwards and backwards about a pitch axis (not shown) which is substantially parallel with a front axle (FIG. 1A) of the vehicle 10. The pitch axis may, for example be located at the height of the front axle. The intermediate seat support 18 has been reoriented ninety degrees about a vertical axis and is pivotally secured to a rocker plate 58. The rocker plate 58 is pivotally secured to the floor 20 of the vehicle 10. This arrangement allows the seat 16 to rotate about the axis 22 and an axis 62 which is substantially perpendicular to the axis 22 and substantially parallel with a horizontal plane. A distance $L_4$ is the height that the axis 62 is located above the pitch axis of the vehicle. A second actuator 64 is pivotally secured to the floor 20 and the seat 16. The control scheme described above with respect to FIG. 3 is generally used to control movement of the seat in FIG. 6. That is, operation of the actuators 36 and 64 is controlled by the processor 42. The sensor 44 measures a roll rate of the vehicle 10 about an axis parallel to the axis 22. A sensor 66 measures a pitch rate of the vehicle 10 about an axis parallel to the axis 62. The processor 42 receives inputs from the sensors 44 and 46 in the form of roll and pitch rate data via data buses.

The processor 42 calculates the integral of the roll rate data from the sensor 44 to determine an instantaneous roll angle $\theta_1$ (FIG. 1). The processor 42 also calculates the integral of the pitch rate data from the sensor 66 to determine an instantaneous pitch angle $\theta_4$. The processor then plugs $\theta_1$ into the equation given above in paragraph 29 along with $L_2$ and $L_1$, and calculates $\theta_2$. The processor also calculates $\theta_5=\theta_4 \times (1+L_4/L_2)$. The distance $L_2$ is used because the axes 62 and 22 are located at about the same height). The angles $\theta_1$ and $\theta_2$ correspond respectively to the angles $\theta_4$ and $\theta_5$, the latter two angles being relevant to a side view of the tractor in which the tractor is pitched forwards or backwards.

Next, the processor 42 uses a lookup table to determine the desired actuator positions in order to achieve the calculated $\theta_2$ and $\theta_5$ angles. Actuators 36 and 64 will change only the angle $\theta_5$ when they are moved in unison. Actuators 36 and 64 will change only the angle $\theta_2$ when they are moved in opposition at the same velocities. Actuators 36 and 64 will change both the angle $\theta_2$ and the angle $\theta_5$ when they are moved at different velocities in the same or opposite directions. Note that the processor 42 receives position data from the actuators 36 and 64 by respective buses. The position data is indicative of a position of the actuators which is correlated to a position of the seat about the axes 22 and 62. As such, the processor is informed of the current position (e.g. extension) of the actuators.

The processor 42 then issues a command signal to each of the actuator 36 and 64 via respective buses which cause the actuators to move to the desired actuator positions. Note that the roll and pitch control signals for each actuator are combined by the processor 42 and then sent to the respective actuator 36 and 64. By successively repeating these steps, the processor 42 utilizes input from the sensors 44 and 66 to determine a desired motion of the seat 16 about the axes 22 and 62, and then operates the actuators 36 and 64 to cause the desired motion of the seat 16 about the axes. This example is advantageous in that it (a) is substantially insensitive to lateral accelerations caused by turning (when the vehicle makes a left or right turn) and gravity, as well as fore/aft accelerations caused by accelerating and braking the vehicle 10, and (b) requires minimal motion sensors. Note that the axes 22 and 62 are substantially orthogonal to each other. These axes can be oriented to be other than orthogonal to each other (i.e. other than 90 degrees offset from each other).

Figure 7:
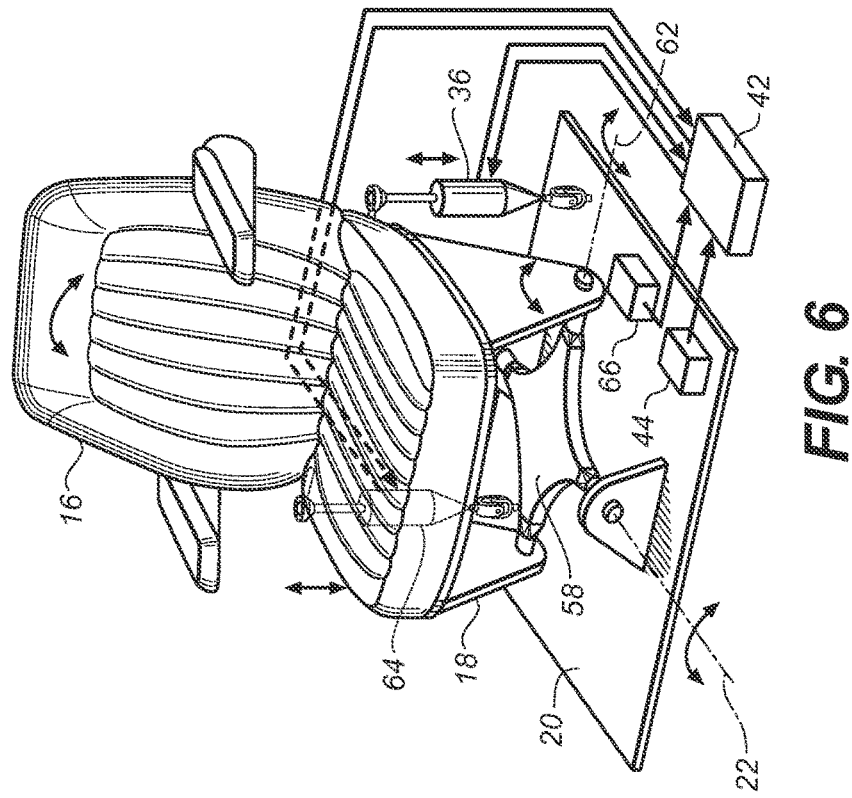
FIG. 7 is a perspective view of another example of a seat system in which the seat can be translated substantially parallel to a first axis.

Turning to FIG. 7, another example of a seat system is provided in which the seat 16 is translated substantially parallel to the axis 62 instead of being rotated about one or both of axes 22 and 62. This system addresses issues with the vehicle 10 rolling about the axis 24 (FIG. 1B). A different intermediate seat support structure 68 is provided which is secured to a pair of rails 70 via four linear bearings 72. The seat 16 can be moved along the axis 62 on the rails 70 by an actuator 74 which is connected to the intermediate seat support structure 68 and the floor 20 of the vehicle. As above, the actuator 74 reports its current position state to the processor 42 and receives movement commands from the processor over a pair of data buses. The roll rate sensor 44 provides a vehicle roll rate about the axis 24 (FIG. 1B) to the processor 42. The processor 42 calculates the integral of the roll rate data to determine an instantaneous roll angle $\theta_1$ (FIG. 1). It should be noted that even though a translation of the seat 16 (and the driver's head) is being used to offset a rotation of the vehicle (and the driver's head), most of the movement that the driver's head would experience from vehicle roll is side-side (very little is up and down), so this is an acceptable solution to the problem.

The processor then plugs $\theta_1$ into the equation $\Delta X_{head}=(L_1+L_2) \times \theta_1$, where $\Delta X_{head}$ is the distance a person's head sitting in the seat 16 needs to be moved side-to-side to counteract rolling of the vehicle about the axis 24. For example, when the vehicle has rotated counter-clockwise (e.g. about the axis 24 in FIG. 1B) by an angle $\theta_1$, the driver's head is translated to the right parallel to the axis 62 by a distance $\Delta X_{head}$. Next, the processor 42 uses a lookup table to determine the desired position of the actuator 74 in order to achieve the calculated $\Delta X_{head}$. The processor 42 then issues a command to the actuator 74 which cause the actuator 74 to move to the desired actuator position. By successively repeating these steps, the processor 42 utilizes input from the sensor 44 to determine a desired motion of the seat 16 along the axis 62, and then operates the actuator 74 to cause the desired motion of the seat 16 along that axis. This example is advantageous in that it (a) is substantially insensitive to lateral accelerations caused by turning (when the vehicle makes a left or right turn) and gravity, and (b) requires minimal motion sensors. This arrangement assumes that there is a stationary roll center height (i.e. $L_1$ does not vary). If it is desired to use a time varying $L_1$, a lateral accelerometer can be used as described above. Rotating seat systems like those shown in FIGS. 1-6 need less clearance around the seat at the height of the axis of rotation of the seat (e.g. about axis 22) so that the seat does not hit another part of the vehicle (e.g. the cab 11) as the seat is rotated. For a rotating seat this clearance requirement increases with distance above the axis of rotation. This allows the cab 11 to be designed with a narrower base. Translating seat systems such as the one shown in FIG. 7 need roughly the same clearance at all heights above the seat base.

Figure 8:
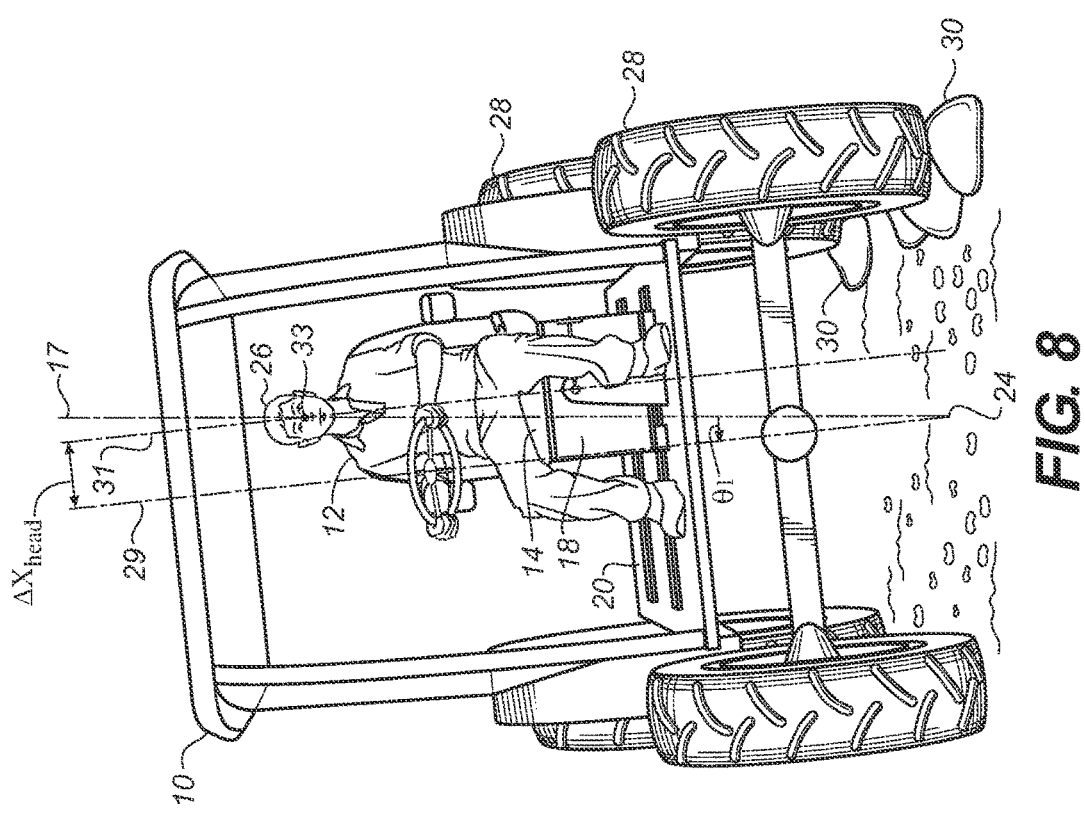
FIG. 8 is similar to FIG. 1B except that the seat system of FIG. 7 is shown in place of the seat system in FIG. 1B.

FIG. 8 is similar to FIG. 1B except that the translating seat system of FIG. 7 has replaced the rotating seat system of FIG. 1B. Here we can see that $\Delta X_{head}$ is the distance between the seat centerline 31 and the vehicle centerline 29. If the home position of the seat is not centered in the vehicle, then $\Delta X_{head}$ is the distance between the seat centerline 31 and the home position of the seat. The seat has been translated to the right (as viewed in FIG. 8) by a distance $\Delta X_{head}$ so that the head of the person 12 remains substantially on the vertical centerline 17.

FIG. 9 shows a seat system that is similar to the seat system shown on FIG. 7 except that in FIG. 9 the seat 16 is being moved forwards and backwards substantially parallel to the axis 22 instead of side-to-side. This system addresses issues with the vehicle 10 pitching about the pitch axis (discussed above). The intermediate seat support structure 68 is substantially the same as in FIG. 7. However, a pair of rails 73 and four linear bearings 75 are provided instead of the rails 70 and the bearings 72 which allow the seat 16 to be moved forwards and backwards. The seat 16 can be moved substantially parallel to the axis 22 on the rails 73 by an actuator 76 which is connected to the intermediate seat support structure 68 and the floor 20 of the vehicle. As above, the actuator 76 reports its current position state to the processor 42 and receives movement commands from the processor over a pair of data buses. The pitch rate sensor 66 provides a vehicle pitch rate about the pitch axis to the processor 42. The processor 42 calculates the integral of the pitch rate data to determine an instantaneous pitch angle $\theta_4$.

The processor then plugs $\theta_4$ into the equation $\Delta Y_{head}=(L_4+L_2)\times\theta_4$, where $\Delta Y_{head}$ is the distance a person's head sitting in the seat 16 needs to be moved forwards or backwards to counteract pitching of the vehicle about the pitch axis. Next, the processor 42 uses a lookup table to determine the desired position of the actuator 76 in order to achieve the calculated $\Delta Y_{head}$. The processor 42 then issues a command to the actuator 76 which cause the actuator 76 to move to the desired actuator position. By successively repeating these steps, the processor 42 utilizes input from the sensor 66 to determine a desired motion of the seat 16 substantially parallel to the axis 22, and then operates the actuator 76 to cause the desired motion of the seat 16 substantially parallel to that axis. This example is advantageous in that it (a) is substantially insensitive to accelerations and decelerations caused by pressing the gas pedal or brake pedal of the vehicle 10, and gravity, and (b) requires minimal motion sensors. This arrangement assumes that there is a stationary pitch center height (i.e. $L_4$ does not vary). If it is desired to use a time varying $L_4$, a fore-aft accelerometer can be used as described above.

In FIG. 10 a seat system is shown in which the seat 16 can be moved both side-to-side and forwards/backwards. The intermediate seat support structure 68 is secured to the rails 70 via the four linear bearings 72 as in FIG. 7. However, the rails 70 are secured to a plate 78 which is interposed between the floor 20 of the vehicle 10 and the intermediate support structure 68. The plate 78 is secured to the four linear bearings 75 which travel along the rails 73. The rails 73 are secured to the floor 20 of the vehicle 10 as in FIG. 9. With this arrangement the seat 16 can be moved substantially parallel to the axis 62 on the rails 70 by the actuator 74 which is connected to the seat intermediate support structure 68 and the plate 78. In addition, the seat 16 can be moved substantially parallel to the axis 22 on the rails 73 by the actuator 76 which is connected to the plate 78 and the floor 20 of the vehicle. As above, the actuators 74 and 76 report their current position state to the processor 42 and receive movement commands from the processor over a pair of wireless data buses 80.

The roll rate sensor 44 provides a vehicle roll rate about the axis 24 to the processor 42. The pitch rate sensor 66 provides a vehicle pitch rate about the pitch axis (FIG. 6) to the processor 42. The processor 42 calculates the integral of the roll rate data and the pitch rate data to determine instantaneous roll angle $\theta_1$ and pitch angle $\theta_4$. Next, the processor 42 calculates the integral of the (a) roll rate data to determine an instantaneous roll angle $\theta_1$, and (b) pitch rate data to determine an instantaneous pitch angle $\theta_4$. Then the processor plugs $\theta_1$ into the equation $\Delta X_{head}=(L_1+L_2)\times\theta_1$, where $\theta X_{head}$ is the distance a person's head sitting in the seat 16 needs to be moved side-to-side to counteract rolling of the vehicle about the axis 24. The processor then plugs $\theta_4$ into the equation $\Delta Y_{head}=(L_4+L_2)\times\theta_4$, where $\Delta Y_{head}$ is the distance a person's head sitting in the seat 16 needs to be moved forwards or backwards to counteract pitching of the vehicle about the pitch axis. The processor 42 uses a lookup table to determine the desired position of (a) the actuator 74 in order to achieve the calculated $\Delta X_{head}$, and (b) the actuator 76 in order to achieve the calculated $\Delta Y_{head}$. The processor 42 then issues a command to the actuators 74 and 76 which cause the actuators 74 and 76 to move to the desired actuator positions. By successively repeating these steps, the processor 42 utilizes input from the sensors 44 and 66 to determine a desired motion of the seat 16 substantially parallel to the axes 22 and 62, and then operates the actuators 74 and 76 to cause the desired motion of the seat 16 substantially parallel to these axes. This example is advantageous in that it (a) is substantially insensitive to accelerations in a horizontal plane and gravity, and (b) requires minimal motion sensors. This arrangement assumes that there are stationary roll and pitch center heights (i.e. $L_1$ and $L_4$ do not vary). If it is desired to use a time varying $L_1$ and/or $L_4$, lateral and fore-aft accelerometers can be used as described above.

Figure 11:
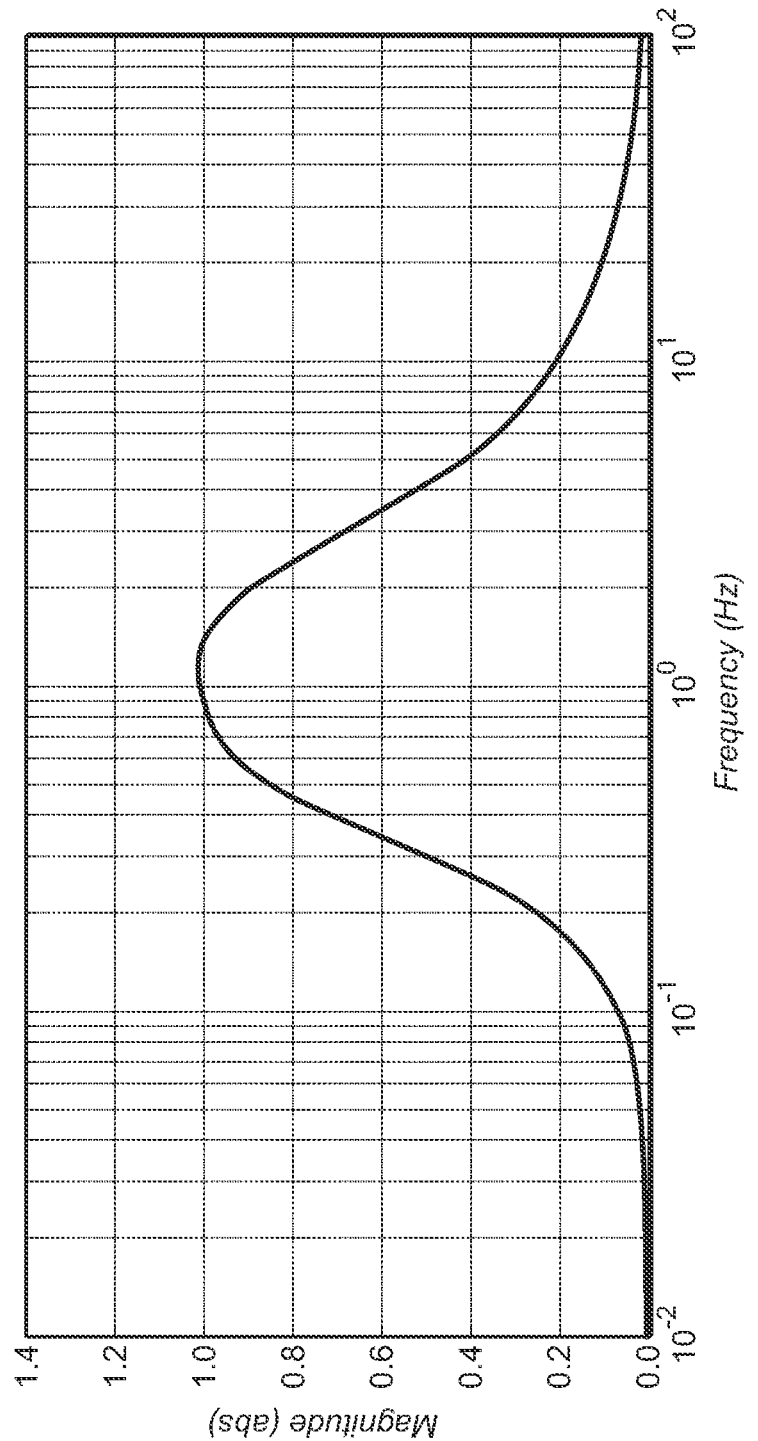
FIG. 11 is a plot of frequency versus a magnitude of the sensitivity of a human to lateral accelerations.

FIG. 11 shows a plot of frequency versus a magnitude of the sensitivity of a human to lateral acceleration. It can be seen that humans are most sensitive to lateral accelerations in the vicinity of 1 hz. Humans are not very sensitive to lateral accelerations below 0.1 hz or above 30 hz. The bandwidth of vehicle rotation that is addressed by the seat system is preferably between about 0.2 hz to about 8 hz, and more preferably between about 0.1 hz to about 40 hz.

A number of implementations have been described. Nevertheless, it will be understood that additional modifications may be made without departing from the spirit and scope of the inventive concepts described herein, and, accordingly, other embodiments are within the scope of the following claims. For example, another embodiment can include a seat that is both translated and rotated. This can be accomplished by modifying the seat shown in FIG. 10 so that the arrangement for moving the seat side-to-side is replaced by an arrangement for rotating the seat about an axis parallel to the axis 22 (e.g. as shown in FIG. 2).

In another version of a seat that is both translated and rotated, the seat system in FIG. 10 is modified to replace the portion of the system that moves the seat forwards and backwards with the portion of FIG. 2 that rotates the seat 16 about the axis 22. If the seat is translated to the right (as viewed in FIG. 10), the seat would also be rotated clockwise. However, as the translation and rotation of the seat are being combined together, both motions can be done to a lesser extent as compared to a system where only rotation (e.g. FIG. 2) or translation (FIG. 7) was used.

In all of the examples described above, the vehicle roll axis 24 was always shown located below the axis 22 about which the seat 16 is rotated (or below the level on which the seat is translated). The arrangements described above can also be used where a vehicle roll axis is located above a seat rotation axis or translation level. This can occur in a tram where a vehicle is suspended from a cable located above the vehicle.

In another example, the axis 22 (see FIG. 1) can be a virtual pivot made with, for example, a four bar linkage or circular track. This arrangement will provide some degree of lateral translation at the floor 20, but without requiring the use of a second actuator. A benefit of this arrangement is that it reduces the lateral acceleration in the torso of a person sitting in the seat 16. This example will consume more sway space and create more relative motion between the person 12 and the pedals/steering wheel of the vehicle 10.

In a further example, the cab 11 is moved relative to another portion of the vehicle (e.g. the frame or fenders) in order to keep the virtual pivot point 33 located substantially along the reference vertical centerline 17. Such movement of the cab 11 can be in place of moving the seat 16 (in this case the seat 16 is secured in place relative to the cab 11), or in addition to moving the seat 11 (in this case the seat 16 is moved relative to the cab 11 and the cab 11 is moved relative to another portion of the vehicle 10). In the former case, the cab is moved by one or more of $\Delta X_{head}$, $\Delta Y_{head}$, $\theta_2$ and $\theta_4$ as described above relative to another portion of the vehicle. In the latter case, the combined motion of the seat 16 relative to the cab 11, and the cab 11 relative to another portion of the vehicle is set to be one or more of $\Delta X_{head}$, $\Delta Y_{head}$, $\theta_2$ and $\theta_4$ as described above. In this latter case the seat and cab move in the same direction which provides more travel room for the seat relative to the cab. U.S. Pat. No. 5,044,455, incorporated herein by reference, discloses actively moving a cab of a truck to address pitching of the truck as the truck travels over a road. The cab 11 can be moved as described in the '455 patent to address pitch and/or roll motions of the vehicle 10 under the control scheme described above.

The examples described above may include a processor with computer components and computer-implemented steps that will be apparent to those skilled in the art. For example, it should be understood by one of skill in the art that computer-implemented steps of a processor may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, controllers, discrete logic, ASICs or other programmable logic device, or may be performed by analog circuitry, or by a combination of analog and digital circuitry.

What is claimed is:

1. A seat system for a vehicle, comprising:
   a seat including a seat bottom on which a person can sit, wherein a first imaginary reference vertical centerline passes through a body of a person who is sitting in the seat when both the seat and the vehicle are in a nominal, level horizontal orientation;
   an intermediate support structure is secured to the seat and the vehicle which allows the seat to move relative to the vehicle;
   a first actuator that can interact with the seat to cause the seat to move relative to the vehicle;
   one or more sensors which can each measure an aspect of motion; and
   a processor that can (i) receive input from each of the one or more sensors, and (ii) utilize the input to determine a desired movement of the seat relative to the vehicle such that a combined motion of the seat relative to the vehicle and the vehicle relative to earth results in motion of the person about a virtual pivot point located substantially along the reference vertical centerline.

2. The system of claim 1, wherein the motion of the vehicle relative to earth is a rotation of the vehicle about a first axis, and wherein the virtual pivot point is located above the first axis about which the vehicle is rotating.

3. The system of claim 1, wherein the virtual pivot point is located above a floor of the vehicle.

4. The system of claim 1, wherein the virtual pivot point is located above a level where relative motion of the seat with respect to the vehicle occurs.

5. The system of claim 1, wherein the processor controls motion of the seat in order to minimize displacement of the virtual pivot point along the reference vertical centerline as the vehicle is rotated.

6. The system of claim 5, wherein the virtual pivot point is located about 1-4 feet above a surface of the seat bottom on which the person can sit.

7. The system of claim 6, wherein the virtual pivot point is located about 2-3 feet above a surface of the seat bottom on which the person can sit.

8. The system of claim 2, wherein the seat is pivotally connected to the vehicle at or near a floor of the vehicle, wherein the actuator causes the seat to rotate about a second axis in an opposite sense relative to the rotation of the vehicle about the first axis.

9. The seat system of claim 2, wherein the seat is able to rotate about a second axis which is non-intersecting with a horizontal plane.

10. The seat system of claim 9, wherein the second axis is substantially parallel to a direction in which the vehicle is moving when the vehicle is traveling in a straight line.

11. The seat system of claim 9, wherein the second axis is substantially perpendicular to a direction in which the vehicle is moving when the vehicle is traveling in a straight line.

12. The seat system of claim 9, further including a second actuator, wherein the seat is able to rotate about a third axis which is non-intersecting with the horizontal plane, the first and second actuators being able to cause the seat to rotate about the second and third axes.

13. The seat system of claim 12, wherein the second axis is substantially parallel to a direction in which the vehicle is moving when the vehicle is traveling in a straight line, and the third axis is substantially perpendicular to a direction in which the vehicle is moving when the vehicle is traveling in a straight line.

14. The seat system of claim 12, wherein the second and third axes are substantially orthogonal to each other.

15. The seat system of claim 1, wherein the seat is able to translate substantially parallel to a second axis which is non-intersecting with a horizontal plane.

16. The seat system of claim 15, wherein the second axis is substantially parallel to a direction in which the vehicle is moving when the vehicle is traveling in a straight line.

17. The seat system of claim 15, wherein the second axis is substantially perpendicular to a direction in which the vehicle is moving when the vehicle is traveling in a straight line.

18. The seat system of claim 15, further including a second actuator, wherein the seat is able to translate substantially parallel to a third axis which is non-intersecting with the horizontal plane, the first and second actuators being able to cause the seat to translate substantially parallel to the second and third axes.

19. The seat system of claim 18, wherein the second axis is substantially parallel to a direction in which the vehicle is moving when the vehicle is traveling in a straight line, and the third axis is substantially perpendicular to a direction in which the vehicle is moving when the vehicle is traveling in a straight line.

20. The seat system of claim 1, wherein the one or more sensors includes a sensor for detecting a roll rate of the vehicle about the first axis which is substantially parallel to a direction in which the vehicle is moving when the vehicle is traveling in a straight line.

21. The seat system of claim 1, wherein the one or more sensors includes a sensor for detecting a roll rate of the seat about a second axis which is substantially parallel to a direction in which the vehicle is moving when the vehicle is traveling in a straight line.

22. The seat system of claim 1, wherein the one or more sensors includes a sensor for detecting a lateral acceleration in a direction that is substantially perpendicular to a direction in which the vehicle is moving when the vehicle is traveling in a straight line and non-intersecting with the horizontal plane.

23. The seat system of claim 22, wherein the lateral acceleration sensor detects the lateral acceleration of the seat.

24. The seat system of claim 22, wherein the lateral acceleration sensor detects the lateral acceleration of the vehicle.

25. A method of controlling motion of a seat relative to a vehicle to which the seat is connected, comprising the steps of:
receiving input at a processor from one or more sensors which can each measure an aspect of motion;
utilizing the processor to determine from the input a desired motion of the seat about a first axis which is substantially parallel to a direction in which the vehicle is moving when the vehicle is traveling in a straight line, such that if a person were sitting in the seat, a combined motion of the vehicle relative to earth and the seat relative to the vehicle will result in that person being rotated about a position associated with their head or higher to substantially reduce side-to-side movement of the person's head; and
issuing a signal from the processor to cause an actuator to rotate the seat about the first axis to achieve the desired motion of the seat about the first axis.

26. The method of claim 25, wherein the seat includes a seat bottom and a seat back which is connected to the seat bottom.

27. The method of claim 25, wherein the one or more sensors includes a sensor for detecting a roll rate of the vehicle about a second axis which is substantially parallel with the first axis.

28. The method of claim 25, wherein the one or more sensors includes a sensor for detecting a roll rate of the seat about the first axis.

29. The method of claim 25, wherein the one or more sensors includes a sensor for detecting a lateral acceleration in a direction that is substantially perpendicular to the first axis and non-intersecting with a horizontal plane.

30. The method of claim 29, wherein the lateral acceleration sensor detects the lateral acceleration of the seat.

31. The method of claim 29, wherein the lateral acceleration sensor detects the lateral acceleration of the vehicle.

32. The method of claim 25, wherein the processor receives an input that is indicative of a position of the actuator which is correlated to a position of the seat about the first axis.

33. A method of controlling motion of a seat relative to a vehicle to which the seat is connected, comprising the steps of:
providing a seat including a seat bottom on which a person can sit, wherein a first imaginary reference vertical centerline passes through a head of a person who is sitting in the seat when both the seat and the vehicle are in a nominal, level horizontal orientation;
securing an intermediate support structure to the seat and the vehicle which allows the seat to move relative to the vehicle;
connecting a first actuator between the seat and the vehicle which can be operated to cause the seat to move relative to the vehicle;
measuring an aspect of motion with one or more sensors; and
operating a processor to (i) receive input from each of the one or more sensors, and (ii) utilize the input to determine a desired movement of the seat relative to the vehicle such that a combined motion of the seat relative to the vehicle and the vehicle relative to earth results in motion of the person about a virtual pivot point located substantially along the reference vertical centerline.

34. The method of claim 33, wherein the motion of the vehicle relative to earth is a rotation of the vehicle about a first axis, and wherein the virtual pivot point is located above the first axis about which the vehicle is rotating.

35. The method of claim 33, wherein the virtual pivot point is located above a floor of the vehicle.

36. The method of claim 33, wherein the virtual pivot point is located above a level where relative motion of the seat with respect to the vehicle occurs.

37. The method of claim 33, wherein the processor controls motion of the seat in order to minimize displacement of the virtual pivot point along the reference vertical centerline as the vehicle is rotated.

38. The method of claim 33, wherein the seat is pivotally connected to the vehicle at or near a floor of the vehicle, wherein the actuator causes the seat to rotate about a second axis in an opposite sense relative to the rotation of the vehicle about the first axis.

39. The method of claim 33, wherein the seat is able to rotate about a second axis which is non-intersecting with a horizontal plane.

40. The method of claim 33, wherein the one or more sensors includes a sensor for detecting a roll rate of the vehicle about the first axis which is substantially parallel to a direction in which the vehicle is moving when the vehicle is traveling in a straight line.

41. The method of claim 33, wherein the one or more sensors includes a sensor for detecting a roll rate of the seat about a second axis which is substantially parallel to a direction in which the vehicle is moving when the vehicle is traveling in a straight line.

42. The method of claim 33, wherein the one or more sensors includes a sensor for detecting a lateral acceleration in a direction that is substantially perpendicular to a direction in which the vehicle is moving when the vehicle is traveling in a straight line and non-intersecting with the horizontal plane.

43. A seat system for a vehicle, comprising:
a seat which includes a seat bottom on which a person can sit;
an intermediate support structure secured to the seat and the vehicle which allows the seat to rotate relative to the vehicle;
an actuator that can interact with the seat to cause the seat to rotate relative to the vehicle;
one or more sensors which can each measure an aspect of motion; and
a processor that can (i) receive input from each of the one or more sensors, (ii) determine from this input a measure of rotation of the vehicle away from a nominal, level horizontal orientation, and (iii) utilize the input to determine a desired rotation of the seat, wherein an angle that the seat has been rotated away from a nominal, level orientation is more than insubstantially larger than an angle that the vehicle has rotated away from a nominal, level horizontal orientation.

44. The seat system of claim 12, wherein the one or more sensors includes (i) a sensor for detecting a roll rate of the vehicle about the first axis which is substantially parallel to a direction in which the vehicle is moving when the vehicle is traveling in a straight line, and (ii) a sensor for detecting a pitch rate of the vehicle about a fourth axis which is substantially perpendicular to a direction in which the vehicle is moving when the vehicle is traveling in a straight line.

45. A method of controlling motion of a person relative to a vehicle in which the person is located, wherein motion of the vehicle relative to earth is a rotation of the vehicle about an axis, comprising the steps of:
providing a seat including a seat bottom on which the person can sit, wherein a first imaginary reference vertical centerline passes through a body of the person who is sitting in the seat when both the seat and the vehicle are in a nominal, level horizontal orientation, the seat being secured to the vehicle;
measuring an aspect of motion with one or more sensors; and
operating a processor to (i) receive input from each of the one or more sensors, and (ii) utilize the input to determine a desired movement of a first portion of the vehicle relative to a second portion of the vehicle such that a combined motion of the second portion of the vehicle relative to the first portion of the vehicle and the first portion of the vehicle relative to earth results in motion of the person about a virtual pivot point located substantially along the reference vertical centerline.

46. The method of claim 45, further including securing an intermediate support structure to the seat and the second portion of vehicle which allows the seat to move relative to the second portion of the vehicle, and connecting a first actuator between the seat and the second portion of the vehicle which can be operated to cause the seat to move relative to the second portion of the vehicle.

47. The method of claim 46, wherein the second portion of the vehicle includes a cab of the vehicle, the seat being able to be moved relative to the cab, and the cab being able to be moved relative to the first portion of the vehicle.

48. The method of claim 45, wherein the second portion of the vehicle includes a cab of the vehicle.

* * * * *